(12) United States Patent
Dighton et al.

(10) Patent No.: US 9,766,478 B1
(45) Date of Patent: Sep. 19, 2017

(54) EYEWEAR WITH IMPROVED FLOATATION AND IMPACT RESISTANCE

(71) Applicants: Timothy Dighton, Ardmore, OK (US); Jeff Gibson, Frisco, TX (US)

(72) Inventors: Timothy Dighton, Ardmore, OK (US); Jeff Gibson, Frisco, TX (US)

(73) Assignee: Amphibia Spiris, LLC, Caverolton, TX (US)

( * ) Notice: Subject to any disclaimer, the term of this patent is extended or adjusted under 35 U.S.C. 154(b) by 0 days.

(21) Appl. No.: 14/455,864

(22) Filed: Aug. 8, 2014

Related U.S. Application Data

(60) Provisional application No. 61/863,877, filed on Aug. 8, 2013.

(51) Int. Cl.
*G02C 5/00* (2006.01)
*G02C 5/06* (2006.01)
*G02C 5/16* (2006.01)
*G02C 11/00* (2006.01)

(52) U.S. Cl.
CPC .............. *G02C 5/008* (2013.01); *G02C 5/06* (2013.01); *G02C 5/16* (2013.01); *G02C 11/00* (2013.01)

(58) Field of Classification Search
CPC ........ G02C 5/008; G02C 11/00; G02C 11/02; G02C 5/00; A63B 33/00; A63B 2225/605
USPC ........................................... 351/43, 131, 132
See application file for complete search history.

(56) References Cited

U.S. PATENT DOCUMENTS

| | | | | | |
|---|---|---|---|---|---|
| 3,517,989 | A | * | 6/1970 | Wilson | G02C 5/00 351/43 |
| 3,740,124 | A | * | 6/1973 | Goodman | G02C 5/00 351/43 |
| 4,966,451 | A | * | 10/1990 | Corral | G02C 11/00 351/158 |
| 5,495,303 | A | * | 2/1996 | Kolentsi | A61F 9/026 2/428 |
| 6,513,925 | B1 | * | 2/2003 | Bonacci | A61F 9/026 351/43 |
| 9,195,076 | B2 | * | 11/2015 | Kavana | G02C 11/00 |
| 2010/0277685 | A1 | * | 11/2010 | Chen | A61F 9/029 351/43 |
| 2012/0033410 | A1 | * | 2/2012 | Garman | G02C 5/008 362/103 |

\* cited by examiner

*Primary Examiner* — Thomas K Pham
*Assistant Examiner* — Nicholas R Pasko
(74) *Attorney, Agent, or Firm* — Harvey Law, P.C.; Donnick W. Harvey

(57) ABSTRACT

This invention relates to eyewear capable of floating above the surface in water and thus easy to spot in open bodies of water. This invention further relates to eyewear comprising an arrangement of modular pods to enable sustain floatation above the surface of water. The invention further relates to modular pods for floating eyewear that comprise an impact-resistant structure.

12 Claims, 15 Drawing Sheets

EYEWEAR WITH IMPROVED FLOATATION AND IMPACT RESISTANCE

This utility patent application claims the benefit of earlier provisional Pat. No. 61/863,877, having a filing date of Aug. 8, 2013.

BACKGROUND OF THE INVENTION

This invention relates to recreational and sporting eyewear capable of floating above the surface in water and thus easy to locate and retrieve in open bodies of water. This invention further relates to eyewear comprising an arrangement of modular pods to enable sustain floatation above the surface of water. The invention further relates to modular pods for floating eyewear that comprise fracture-resistant structures.

Eyewear solutions have evolved to address a range of different recreational activities, allowing for fashion to merge with function, and protecting its wearer's eyes against the elements of nature and injury. In particular, sunglasses have become integral accessories in water recreational activities where the environment for wearers of sunglasses comprises bodies of water with flow, waves and other forms of turbulence. Often, prescription lenses are integrated into the frames of sunglasses, as other modifications or accessories that add weight to the overall eyewear. As the quality and design of recreational sunglasses increase to meet the needs of those who enjoy the recreational outdoors, so do the value and ultimately cost of the eyewear.

Prior art solutions do not address the issue of preventing eyewear slipping from the face of the user, especially from the nose bridge area. Preventing eyewear from falling into water is an unfulfilled need.

Another issue with prior art solutions is that the solution for floatation is difficult to maintain on a long-term basis. First, eyewear is often subjected to crushing and many other damaging events, especially in during recreational activities that require activities in motion, high levels of exertion, or exposure to implements and tools used for sporting events. Trauma to eyewear can also damage insufficiently designed buoyancy technology of the eyewear so that it fatigues, leaks and otherwise fails. Because modern recreational eyewear must endure such repeated trauma, often to the frontal portion of the eyewear, prior art solutions have not considered how resulting stress forces impact its structural integrity.

Specifically, the unaddressed challenge in providing eyewear having air chambers to enable floatation is to properly account for forces of impact upon the eyewear. Anytime eyewear sustains a frontal impact, there is a risk to a user's eyes. As forces impact the front or lens portion of eyewear, the resulting ripple of force lines throughout the eyewear tend to concentrate stress around any voids within the eyewear. If the structures around voids have compromised integrity, those structures may rupture fragment and cause injury to the eye. By deploying eyewear with seams that seal an air chamber within the frames, like those seen in Goodman U.S. Pat. No. 3,740,124, the weakest portion of the air chamber is at risk for rupture, which can result in a fragmentation of the materials around the air chamber.

A common apprehension with investing in recreational sunglasses is the possibility of losing them into a body of water. Though prior art solutions may provide properties of buoyancy and momentary floatation, if the lens portion is not sustained above the water surface then only the tips of the arms of the eyewear may be visible. When trying to recover eyewear in a moving body of water like an ocean, a river, or lake, exposing only tips of the arms above the water can render the chance for spotting the eyewear only slightly better than searching at the bottom of the body of water. Once the eyewear of the prior art assumes the profile of the lens portion being parallel to the surface of the water will result in further sinking, well below the surface.

Specifically, some prior art solutions have provided so-called floating eyewear with frames that are multiple pieces that are joined to capture air within chambers of the frames, especially at the temple and the arms. However, those attempts fail to compensate for how buoyant eyewear behaves in the water. The weight of the front portion of most buoyant eyewear solutions fails to sustain the lens portion above the surface of the water, exposing the often bowl-like facial sides of the lenses to an opposing force of water weight and surface tension. The difference is critical when examining the structures of eyewear and accompanying weight distribution. The lens frame portions of eyewear available in the current arts and popular in recreational sports comprise most of the total weight, especially in recreational sporting environments. When these eyewear solutions fall into water, the weight of the lenses pull the lenses downwardly below the surface of the water, and tips of arms of the eyewear in an upwardly fashion so the arms are above the water. Even if the eyewear does not initially submerge during the initial fall, turbulence in open water often will sweep over the eyewear and apply a pressure onto the surface area of the facial lens portion. As a result, three critical disadvantages occur. First, if the arms are positioned above and perpendicular to the surface of water, with the lenses parallel to the surface of the water, the arms are difficult to spot. The lenses may reflect sunshine and provide a superior visual signal if they are perpendicular and above the surface of the water. Second, after the eyewear submerges for any reason, water pressure and surface tension will often prevent the eyewear from resurfacing as the weight of water atop the facial side of the lenses bias them downwardly, eventually pushing the entire eyewear below the surface of the water, rendering a search from a vessel or above search vantage point fruitless. The prior art has provided examples of buoyant eyewear but failed to provide a solution to keeping recreational sporting eyewear afloat.

Manufacturing multiple lines of floating eyewear provides additional challenges, as the relative weights of such eyewear may vary according to utility. For example, though the lens portion of the frame typically weighs more than the combined weight of the arms, the overall weight of an impact resistant, a large sized, military grade line of sunglasses will comprise more material and thus weight than a small sized, less reinforced model. Additionally, manufacturers of diverse lines of similar sized eyewear may wish to make value-based, short-life models that are lighter than resilient, models that may be used for prescription lenses. Providing a solution that allows manufacturers to provide a range of air volumes for the same basic mold of eyewear would resolve a need for providing a comprehensive line of floating eyewear for customers with different needs while maintaining an efficient and cost-effective sourcing strategy.

The present invention solves these problems by providing eyewear that is not only buoyant, but may remain floating in turbulent waters. The present invention provides eyewear that floats in a preferred profile that minimizes the possibility of the lens frame portion dropping below the surface of water in a perpendicular orientation. The present invention further provides an eyewear configured with floating structures that fit upon a user's anatomy in a manner that reduces the likelihood that the eyewear will slip and fall from the user's face into the water. Additionally, the present invention provides floating eyewear that is impact and fracture resistant to offer superior protection of the user's eyes than other solutions offered in the prior arts. The present invention offers a long-term floating eyewear that maintains floating functionality after traumatic events that may otherwise breach the floatation structures provided in the prior art.

SUMMARY OF THE INVENTION

In one embodiment, the present invention provides floating eyewear comprising a frame with a first arm, a second arm, and a lens portion having an facial side and an exterior side, the lens portion having at its facial side a bridge modular pod, the first arm having a modular pod, and the second arm having a modular pod, whereas the bridge modular pod, the first arm modular pod and second arm modular pod are capable of displacing the lens portion to sustain a perpendicular profile on the water surface. The bridge modular pod may comprise convex and concave aspects. The aspects may communicate with and seat upon a user's face in a reverse image. The bridge modular pod may include a resilient element.

In another embodiment, the present invention provides a modular pod for use with eyewear, the pod being self-contained and having a front end and a back end that correlates to a front end and back end of eyewear, the pod having more air volume at the back end than the front end, the pod having an arcuate aspects to its profile, the pod further having a resilient element that is thicker at the front end than the back end.

In another embodiment, floating eyewear for use in recreational sports in accordance with the first embodiment, wherein the properties of the elements of the eyewear are in accordance with the following expression:

$$F2<B1+B2+B3+(V2 \times SG2)+F1$$

V2 is the displacement of the lenses
L is the buoyant force of the lenses
F1 is the buoyant force of the lens frame portion
F2 is the buoyant force of the first and second arms and hinging portions
B1 is the buoyant force of the first arm modular pod
B2 is the buoyant force of the second arm modular pod
B3 is the buoyant force of the bridge modular pod.
SG2 is the specific gravity of the material from which the lenses are made Numerous objects and advantages of the invention will become apparent as the following detailed description of the preferred embodiments is read in conjunction with the drawings which illustrate such embodiments.

DETAILED DESCRIPTION OF THE PREFERRED EMBODIMENTS

Figure 1:
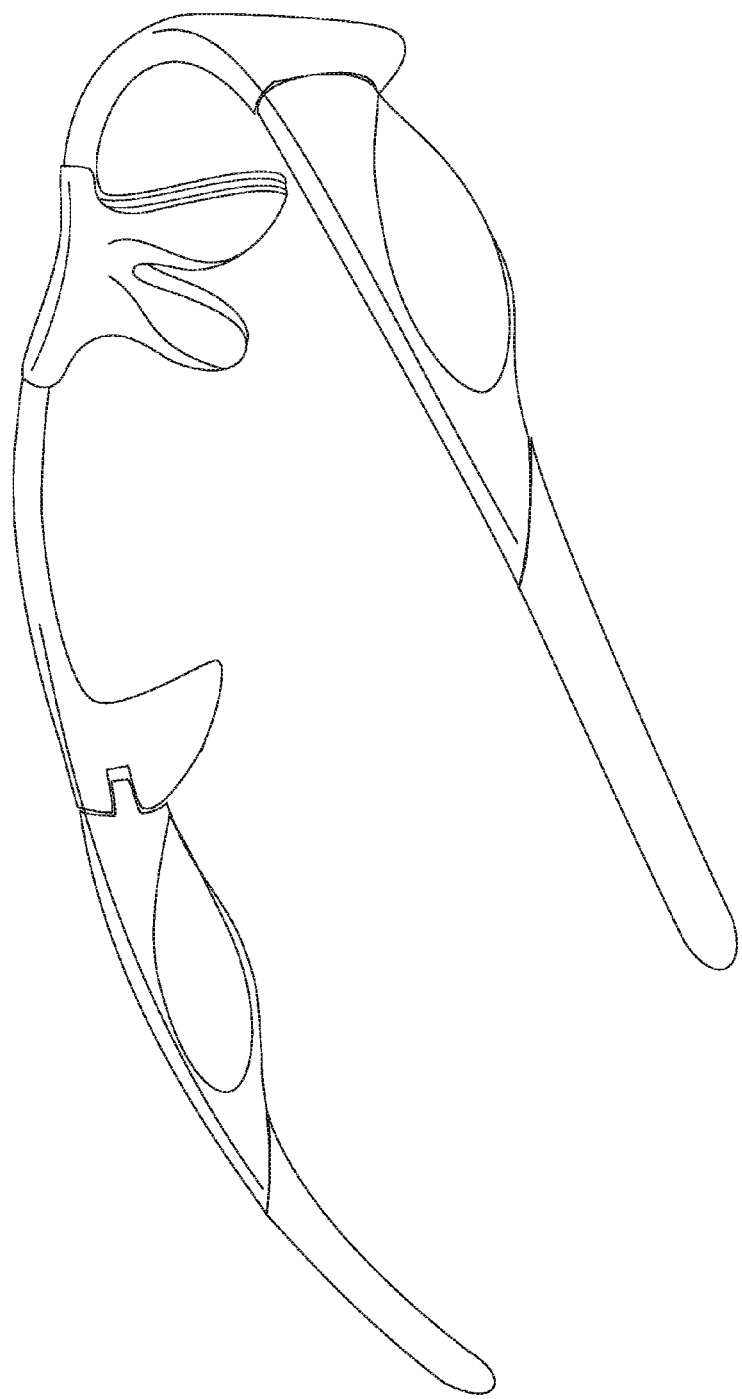
FIG. 1 depicts a rear, elevation perspective view of an eyewear frame.

FIGS. 1-24 depict preferred embodiments of eyewear and modular pods. Eyewear may comprise a lens frame portion, a first arm, and a second arm. A first hinging portion using hinging structures known in the arts may be positioned between the first arm and lens frame portion, and a second hinging portion may be positioned between the second arm and lens frame portion. The lens frame may comprise a first and second lens portion and a bridge portion that connects the first and second lens portion. Lens frame may comprise a variety of materials known in the arts of eyewear construction, such as TR90 or TR90-NZZ plastic-type materials. First arm and second arm may comprise a variety of materials known and used in eyewear, and each said arm extends from a front portion of the arm to a back portion of the arm.

Lens frame may further comprise a first lens and second lens, and exterior side perpendicular to the first and second arms, and a facial side opposite that of the exterior side of the lens frame. The bridge portion of the lens frame may have a side perimeter that provides a lens slot into which a first lens and a second lens may reside securely, the lens slots and respective lenses mating in a co-planar relationship. The bridge portion may further comprise at its facial side a facial perimeter, and near which a groove that may closely track portions of or the entire the facial perimeter, but with a smaller circumference. In another embodiment, the groove may be set within a recess of the facial side of the bridge portion, the recess also following a similar track of the facial perimeter, but with a smaller circumference so the recess may be inset of the facial perimeter.

Modular pods may be positioned at locations on the eyewear. Pods may comprise moldable plastic, such as TR90 or TR90-NZZ, and/or with elastomeric materials such as rubber and other materials known to provide flexure. In an embodiment of the invention seen in FIG. 1, a first arm modular pod and a second arm modular pod are shown as being deployed at least partially within the first arm and second arm, respectively, and may comprise a front end of the pod and a back end of the pod, correlating to a front portion of the first arm and a back portion of the first arm. Each arm modular pod may be positioned proximal to the front portion of its corresponding arm, or near the hinging portion.

Each of the first and second arm modular pods may resemble a self-contained oval as indicated in FIGS. 6(f) and (g), the narrow end of the oval positioned at the front end of the modular pod. In other embodiments of the invention, the arm modular pods may comprise other structures having convex and/or concave aspects, such as a teardrop with an apex at the front end of the arm modular pod and oriented towards the front end of the arm pod. Arms of the eyewear connect to the lens frame portion, either directly or through hinging or other structures. As embodied in FIG. 1, a first arm may comprise a modular pod disposed between a front portion of the arm and the back portion of the arm. Shown in FIGS. 1-2, pods may be molded into the arms seamlessly so that the respective margins between the pods and arms are unbroken or flush. In other embodiments, pods may break out or protrude from the arms. The modular pods may have frame portions that reside within the frame and nonframe portions that do not reside with the arms of the frames. In another embodiment, modular pods are self-contained, elastomeric in nature, frictionally fit into an accessible void in the arm frame, and removeable so that they may be replaced after continuous use if breached by, for example, a direct and/or sharp impact.

Figure 5:
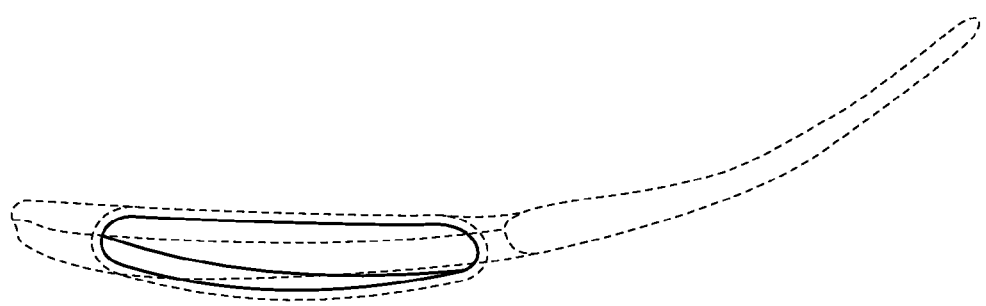
FIG. 5 depicts a cross sectional view of the arm modular pod shown in FIG. 4.
Figure 6:
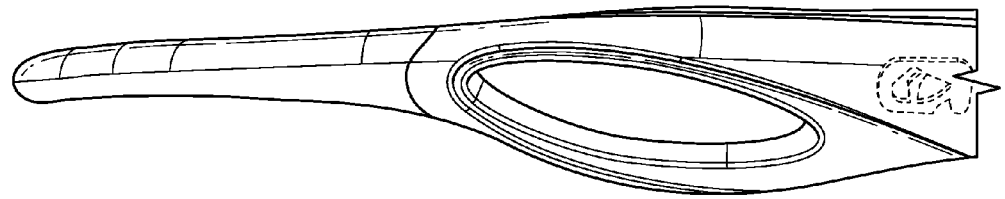
FIG. 6 depicts a side view of an embodiment of the arm modular pod having a resilient element.
Figure 7:
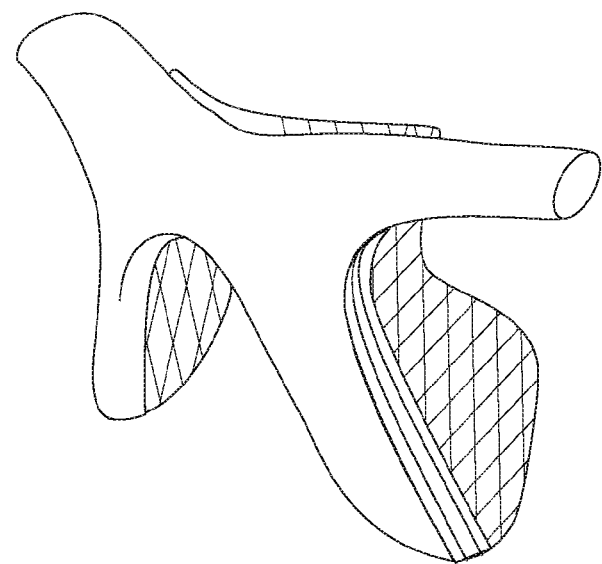
FIGS. 7-9 depict various views of a first embodiment of the bridge modular pod.
Figure 8:
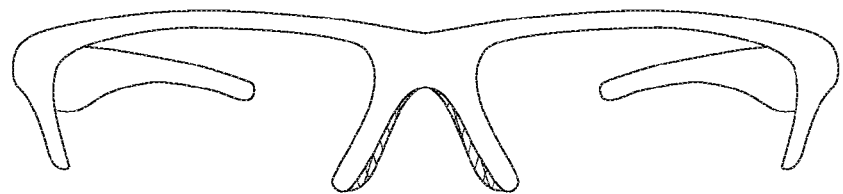
Figure 9:
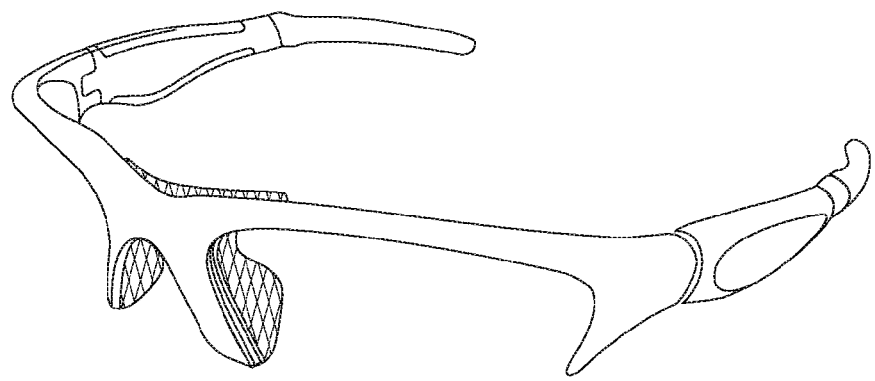
Figure 10:
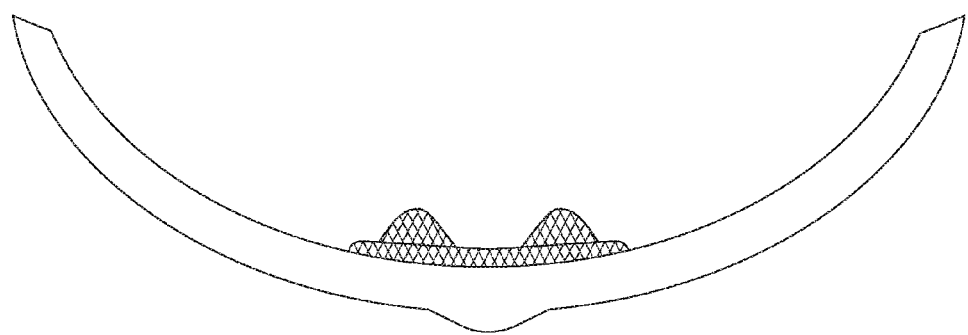
FIGS. 10 and 11 depict top and bottom views of the first embodiment of the bridge modular pod
Figure 11:
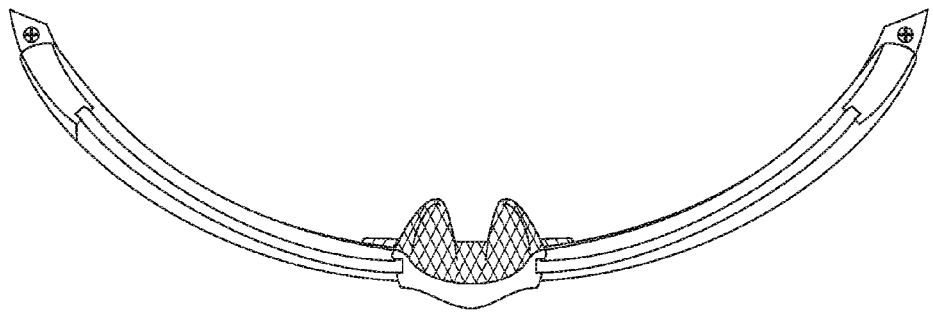
Figure 12:
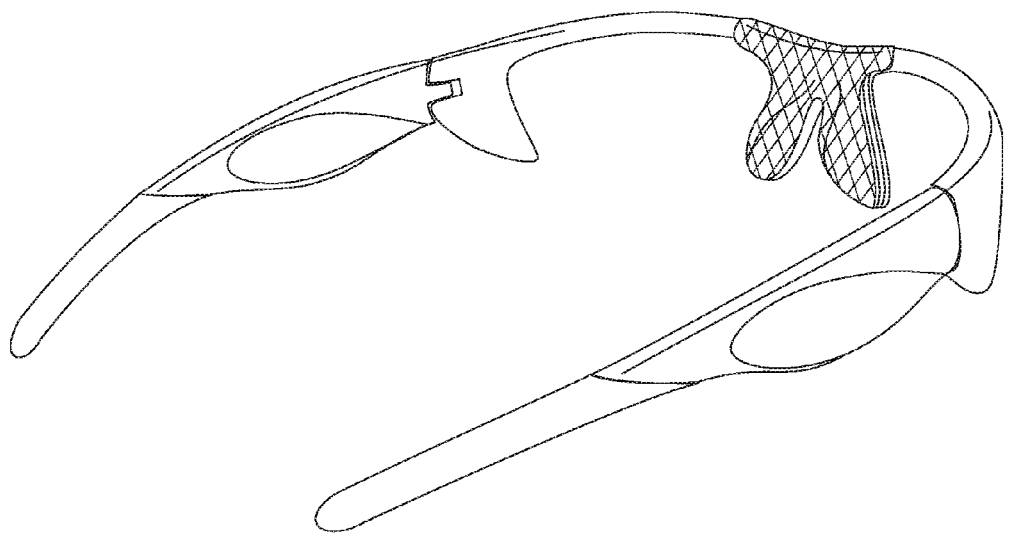
FIGS. 12 and 13 depict a side perspective view of an embodiment of the bridge modular pod as it first upon a frame of the eyewear.
Figure 13:
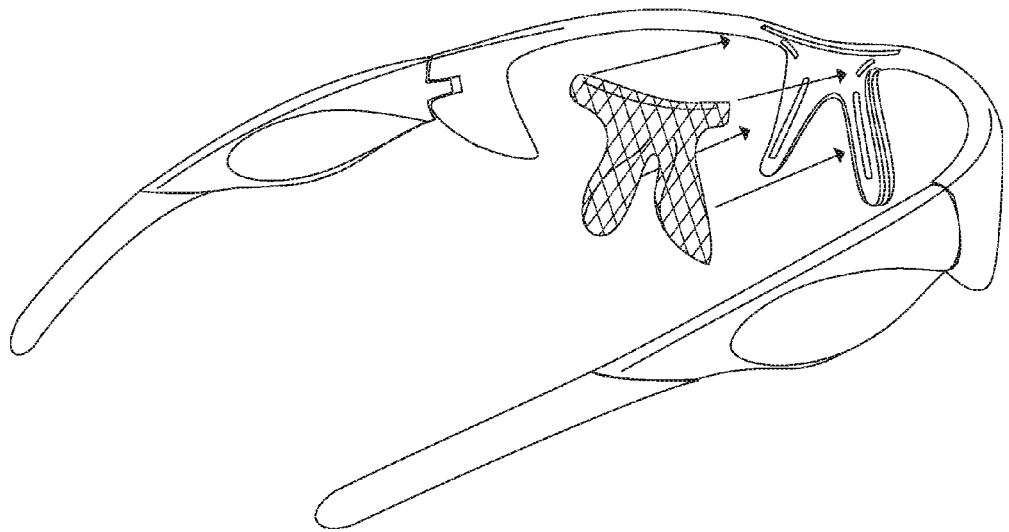

Arms may have 3 dimensional geometry as shown in FIG. 5, with the perimeter of the each arm comprising a margin line. In an embodiment of the invention shown in FIG. 3, a modular pod placed the arms may exceed the margin line of the arm so that at least a portion of the modular pod exists outside of the margin line.

As shown in FIGS. 5, 6G and 6H, modular pods may comprise an interior portion and an exterior portion. The interior portion may hold a volume of media that is lighter than water, such as air. In FIGS. 4a-b, pod is shown to include a resilient element positioned about the interior portion of the modular pod. Resilient element as shown in FIG. 4b may generally cover the nonframe portions of the modular pods. Resilient element may further comprise a thickness that is greater towards the front portion of the pod than it is to the back portion of the pod, or to the back portion of the arm, so that the pod has a greater volume towards the back portion of the pod than the front portion of the pod. Continuing with FIGS. 4a-4b, resilient element may comprise a channel deployed about the exterior portion of the modular pod. The channel may increase in depth as it travels to the back portion of the pod in a coaxial relationship with the arm. In other embodiments not shown, channel may be positioned on the interior portion of the pod, the top or bottom portions of the modular pod, or about frame portions of the modular pod.

The modular pod is positioned generally in the temple region of the first arm and at the second arm, between a front portion of each arm and a back portion of each arm. Modular pod is shown with a teardrop design in FIGS. 1 and 12, with an apex of the tear oriented towards the front of the front end of the modular pod. Other configurations and arrangements are within the scope of the invention for the modular pod to resemble a sphere, an oval, or other shapes having convex, concave or angular aspects.

In an embodiment shown in FIG. 1, a bridge modular pod may be positioned at the connecting portion of the eyewear, or at a center of the lens frame portion. The bridge modular pod may include convex and concave aspects that allow the bridge modular pod to directly or indirectly interface with anatomy of a user of eyewear, specifically, the nasal ridge and root of a human nose. In an embodiment shown in FIGS. 1, 10 and 11, the bridge modular portion comprises a mold of a prototypical human face, resembling a reverse model of the nose anatomy described above. Bridge modular pod may be constructed of an elastomeric material such as a high-density silicone or other rubber-like materials known to provide flexure. Bridge modular pod may be removeable and replaceable in an embodiment of the invention, and replacement bridge modular pods may be selected from a variety of colors and resilient elements as described herein. In yet another embodiment, a bridge modular pod may be customized to a purchaser's nasal root anatomy before mating to the lens frame portion. A digital or physical model may be take of the purchaser's nasal root anatomy, replicated, and created by 3D printer or other fabrication means.

In FIGS. 15-20, bridge modular pod may be positioned within a recess of the facial side of the lens frame portion. In embodiments not shown, bridge modular pod may be a self-contained unit that is formed to frictionally fit within a recess of the facial side of the lens frame portion. Recess may be defined by a lip positioned proximal to the facial perimeter, the lip further having a concave aspect that may lock in the self-contained bridge modular pod. Self-contained bridge modular pod may further mate with the facial side of the lens frame through the use of silicone glues and other adhesives.

Figure 14:
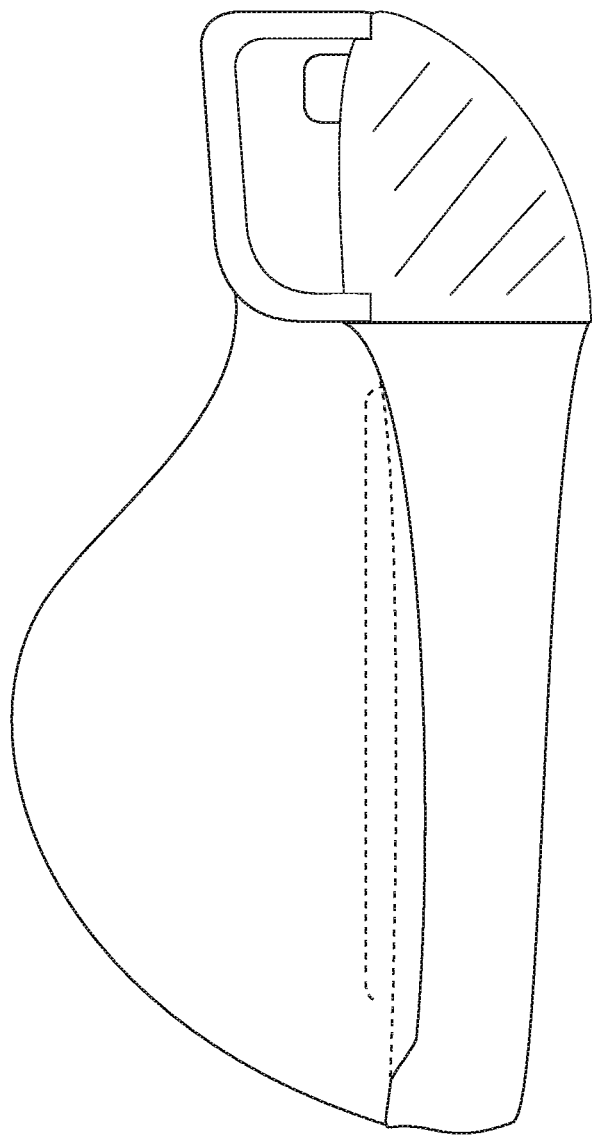
FIG. 14 depicts a cross section of an embodiment of the bridge modular pod.
Figure 15:
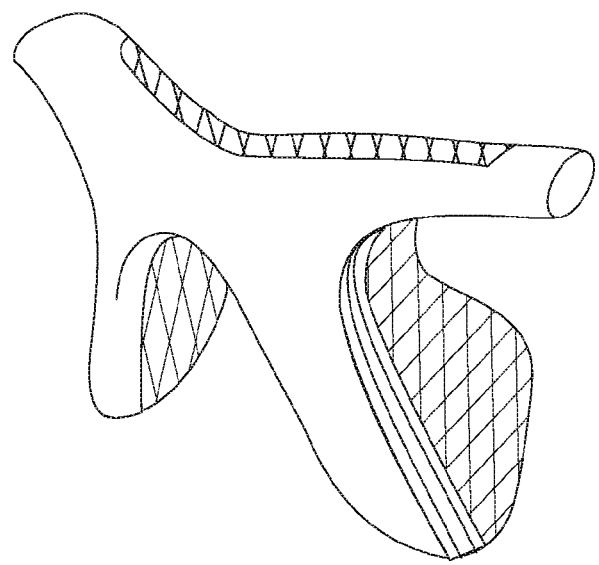
FIGS. 15-20 depict various views of a second embodiment of the bridge modular pod.
Figure 16:
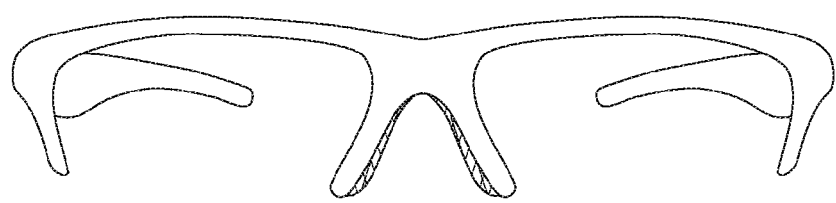
Figure 17:
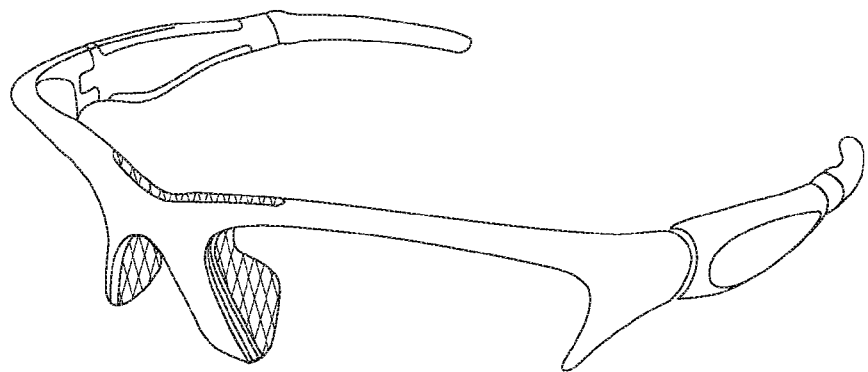
Figure 18:
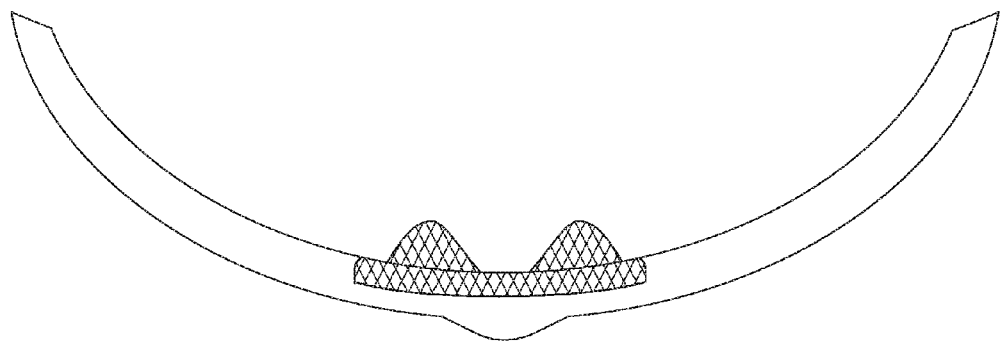
Figure 19:
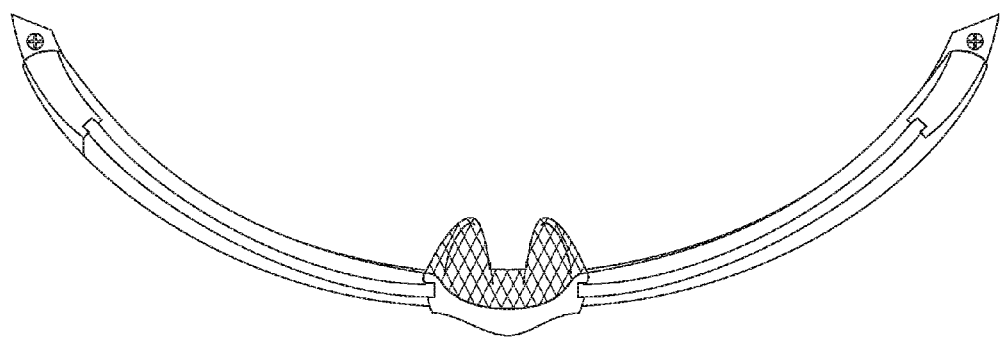
Figure 20:
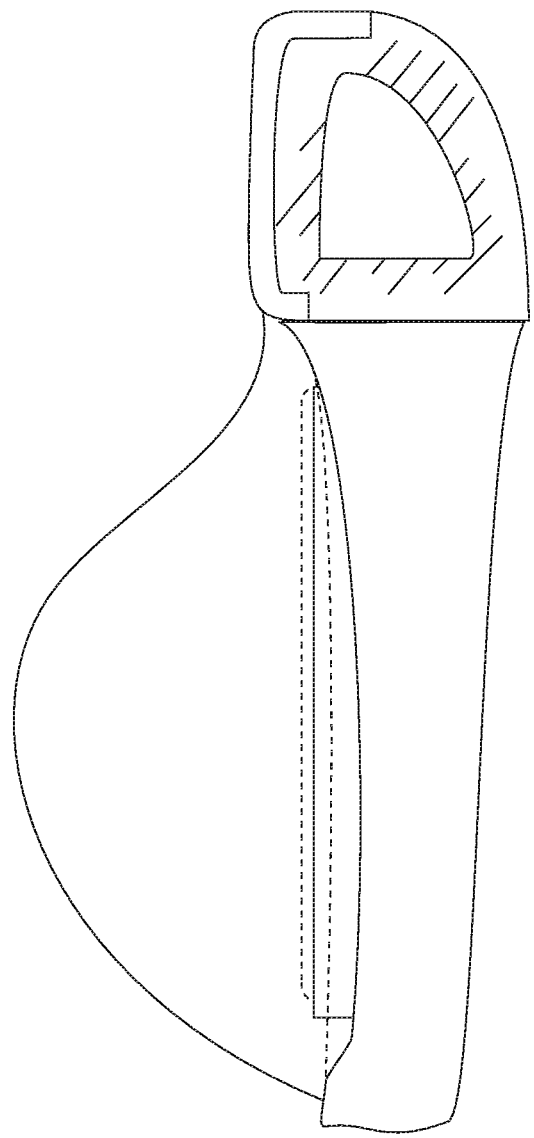

Looking at FIGS. 14 and 20, a bridge modular pod may be over-molded into the groove of the facial side of the lens frame portion and reinforced with locking hooks. In an embodiment shown in FIGS. 15-20, the groove is positioned in the recess portion of the facial side of the perimeter, shortening the distance between the lens frame and the face of the user by approximately 4 mm, though the difference may be greater or lesser depending upon needs of a particular line of eyewear.

In an embodiment of the invention, the bridge modular pod may further comprise an interior and an exterior, and a resilient element. The resilient element may be positioned at either the interior or exterior of the bridge modular pod and may populate a partial portion of the bridge modular pod or the entire area bridge modular pod. In an embodiment, the resilient element may cover the exterior of the bridge modular pod.

Figure 21A:
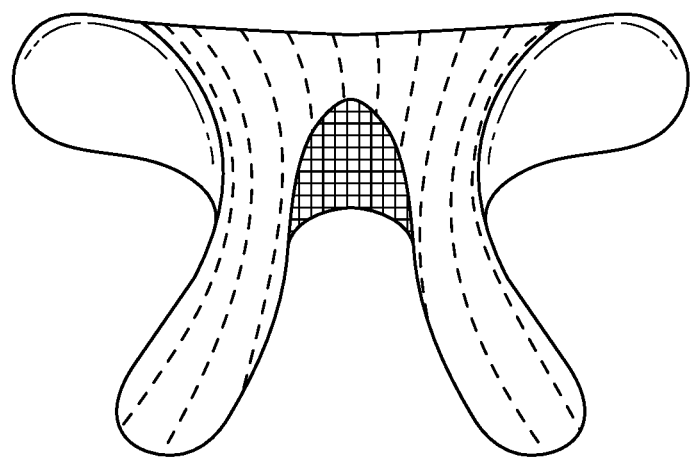
FIGS. 21a and 21b depict two embodiment of the bridge modular pod having resilient elements.
Figure 21B:
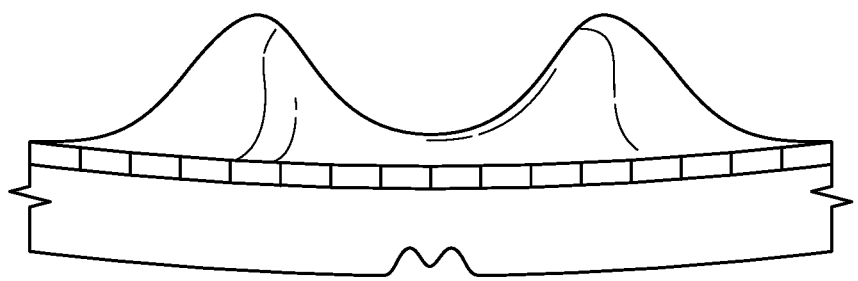

Resilient element may comprise a framework of individual cells. Individual cells may be filled with air or constructed solid throughout. As shown in FIG. 21a-21b, resilient element comprises individual cells arranged about the bridge modular pod that resembles a honeycomb.

In another embodiment, the resilient elements may be positioned in adjoining areas that adjoin the lens frame or arms where modular pods are deployed. In an embodiment show in FIGS. 8 and 9, resilient elements are positioned at interfaces of the first and second lens portions with the bridge modular pod. In this embodiment, resilient element may be fixably attached to the frame and attached to a modular pod, either directly or indirectly.

In an embodiment of the invention, the bridge modular pod comprises a high silicone material. Other materials within the scope of the invention may include rubber or other elastomeric materials. The eyewear bridge may be understood to provide greater cushioning, comfort and shock absorption to the areas interfacing the nasal ridge or root of the nose, protecting both the modular pod from rupture and the human nasal root and bridge from impact. As a user experiences additional impacts to the frontal side of eyewear, the modular design proved to be less susceptible to leakage of air than other, joined or welded air chambers.

Figure 22:
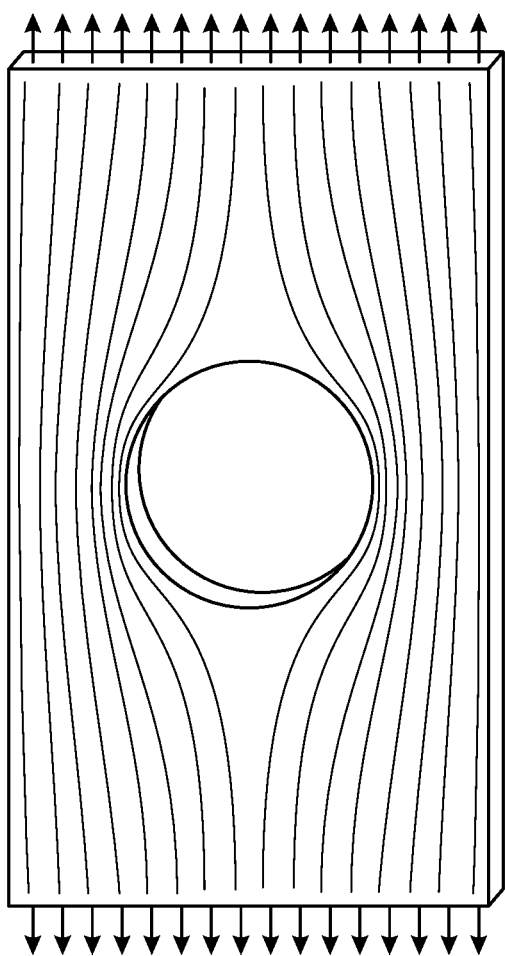
FIG. 22 shows a diagram of how stress forces concentrate around a void in solid material.
Figure 23:
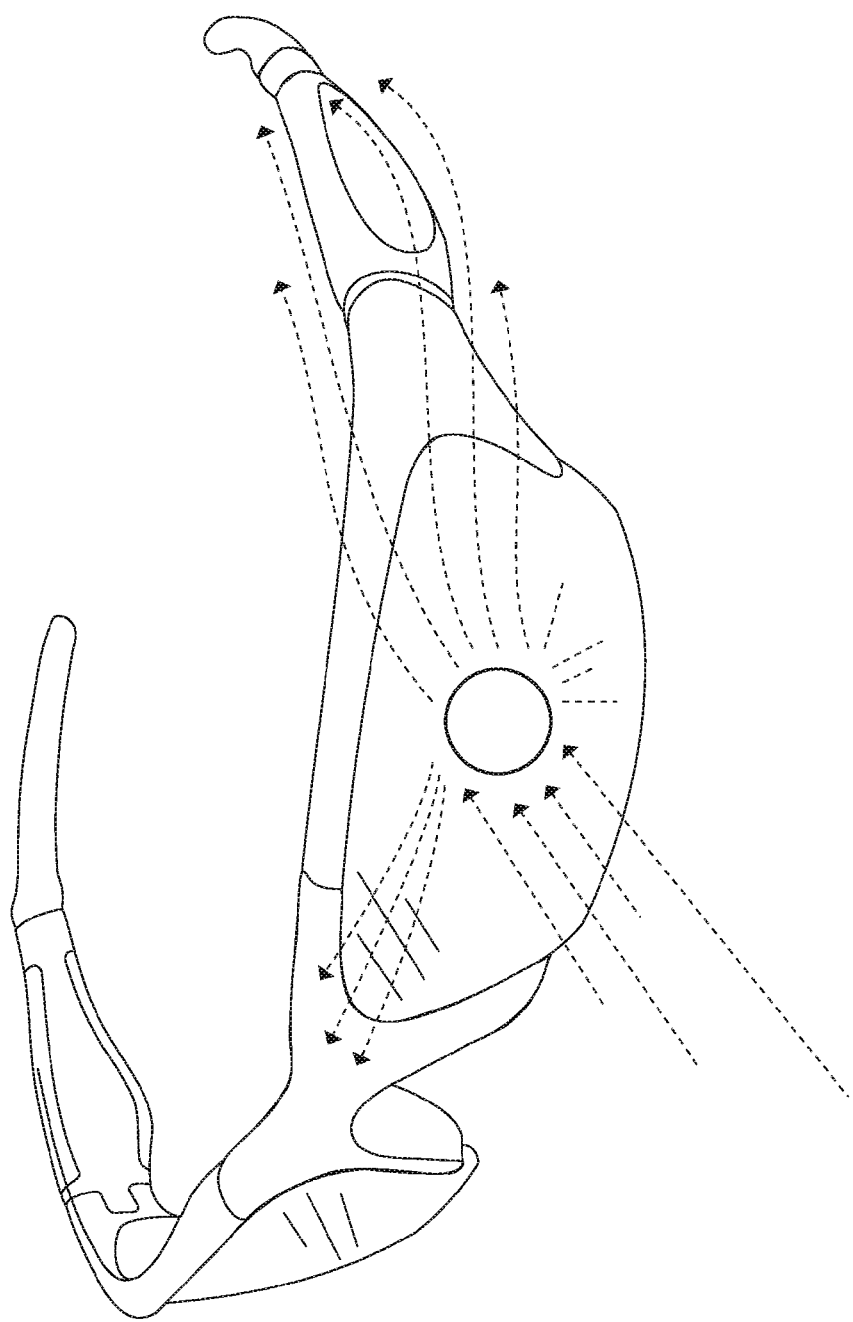
FIG. 23 shows force distribution from an impact to the front end of the eyewear.

An unexpected benefit to deploying a bridge modular pod outside of the lens frame, as shown in FIGS. 22-23, is that lessening the likelihood of fracturing the eyewear, especially when its frame materials are of a rigid plastic or metallic make. Applicant found that by placing a modular pod outside of the lens portion of the frame, said frame and arms were less likely to rupture and fragment into pieces that could cause injury to the eye of the user. Testing of the embodiment of eyewear shown in FIG. 23 confirmed that it passed a high mass impact test and a high velocity impact test of 150+ft/s without breaching the modular pods or compromising structural integrity.

Figure 2:
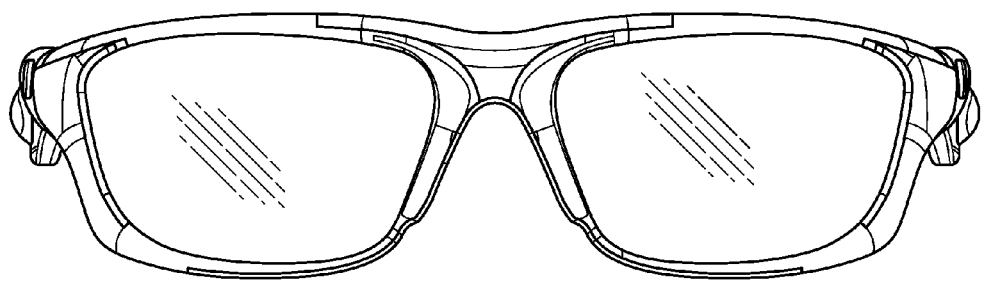
FIG. 2 depicts a front view of the eyewear.
Figure 3:
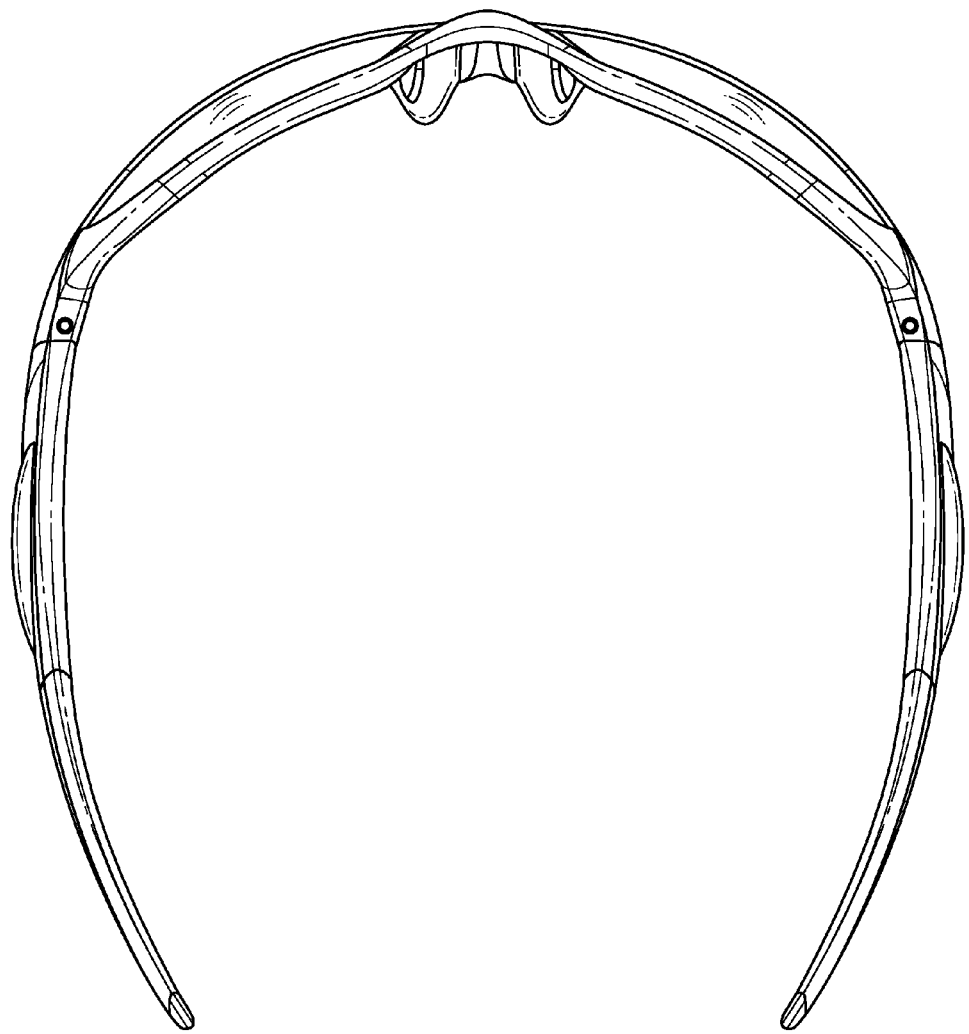
FIG. 3 shows a top plan view of the eyewear having three modular pods in a triangular relationship.
Figure 4:
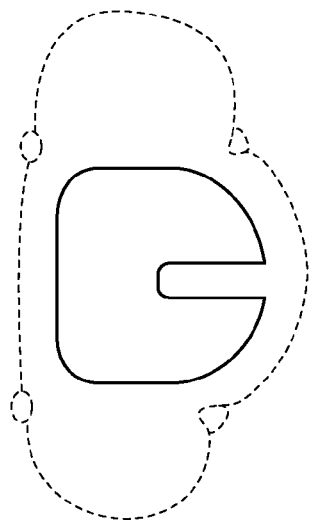
FIG. 4 depicts a top view of an embodiment of an arm modular pod having a resilient element.

An embodiment of the invention shown in FIGS. 1-3 comprises an arrangement of three (3) modular pods upon the improved floating eyewear. The relationship of the 3 modular pods may be imagined as triangulation, as seen in FIG. 3. In another embodiment, other modular pods may be added in addition to the three (3) modular pods depicted. The additional pods may fall near the lines of triangulation that exists between the three (3) modular pods.

Figure 24:
FIG. 24 shows an front perspective view on an embodiment of the invention as floating in water.

In the embodiment depicted in FIG. 24, the eyewear comprises a frame having lens frame portion, a first arm and a second arm. Modular pods are placed: 1) a first arm modular pod at the first arm near the front portion of the first arm, 2) a second modular pod at the second arm near the front portion of the second arm, and 3) a bridge modular pod generally at a center of the lens portion adjacent to the bridge and on the facial side of the lens frame portion. In open waters, this arrangement of modular pods with respective air volumes maintain the lens frame portion in a perpendicular relationship with the surface of water, and the arms in a parallel profile with the surface of water. The afore-described position on the surface of open water shall be referred to herein as a preferred profile of the floating eyewear.

Applicant found that bridge modular pod outside the lens frame portion displaced enough weight from the lens frame to, when arranged in combination with the arm modular pods, enabled a preferred profile of the eyewear a preferred profile on water. Applicant discovered that this inventive eyewear regained or maintained the preferred profile of the lens frame portion perpendicular to the surface of the water even when subjected to turbulence, waves, and physical contact that briefly submerged the eyewear.

The specific dimensions of floating eyewear and its modular pods can vary within the scope of the present invention. Determining whether eyewear may meet the preferred profile of floating eyewear may be derived from the following expression addressing the properties of the eyewear portions and modular pods:

$V2$ is the displacement of the lenses
$L$ is the buoyant force of the lenses
$F1$ is the buoyant force of the lens frame portion
$F2$ is the buoyant force of the first and second arms and hinging portions
$B1$ is the buoyant force of the first arm modular pod
$B2$ is the buoyant force of the second arm modular pod
$B3$ is the buoyant force of the bridge modular pod.
$SG2$ is the specific gravity of the material from which the lenses are made Assuming that $L=V2 \times SG2$, then if $F2<B1+B2+B3+L+F1$ the eyewear should float in a preferred profile of the eyewear on the surface of the water, which is understood to have a specific gravity of 1 g/cm3.

It is not enough to calculate an overall specific gravity of the eyewear to that equal less than that of water, or 1 g/cm3. As described above and incorporated into the expressed formula, a preferred profile of the eyewear on the surface of open water requires the displacing the lens portions of the frame sufficiently to not sink and turn its facial side to a profile that is parallel with water surface. The facial side typically resembles a concave bowl when turned upwards and parallel to the water surface, which exposes it to the weight and downward pressure of water. By meeting the above standard of keeping the lens frame portion afloat, the eyewear will be capable of floating in a sustained fashion that enables its retrieval.

In another embodiment of the invention, reflective portions may be included in lens portion of the floating eyewear, so that the eyewear signals a user tasked with retrieving the eyewear that is floating in a preferred orientation. Reflective portions may include lenses widely known and used in the arts. Reflective portions may also be applied to the lenses of the eyewear to enable the reflection of sun or other light source.

Another embodiment of the invention regards a line of floating eyewear that uses series of modular pod sizes. The modular pods may have similar shapes but comprise a series of sizes that contain different volumes of media the enabling floatation with different configurations and weights of eyewear frames. In this embodiment, a kit is provided with series of modular pod molds (P) and series of eyewear frames (F). By way of example, the series of modular pod molds may take the form of hollow ovals of increasingly larger sizes that may fit a variety of frames manufactured to float. The eyewear frames may be equipped for a variety of functionalities—for example prescription lenses, impact resistance, turbulent conditions, aesthetic design choices, disposable use, all of which affect the weight of the frames and especially the lens frame portions. By providing the described kit, a maker of the improved floating eyewear may reliably choose the modular pods necessary to enable the floatation of the eyewear as it should properly float atop the water in order to prevent sinking.

Other embodiments of the current invention will be apparent to those skilled in the art from a consideration of this specification or practice of the invention disclosed herein. Thus, the foregoing specification is considered merely exemplary of the current invention with the true scope thereof being defined by the following claims.

What is claimed is:

1. Floating eyewear comprising:
   a frame that comprises a first arm, a second arm, and a lens frame portion having a facial side and an exterior side, the lens frame portion extending between connections to the first arm and the second arm,
   a bridge modular pod comprising a facial side surface and an exterior side surface such that the facial side surface and the exterior side surface completely enclose an interior cavity,
   wherein the exterior side surface of the bridge modular pod is affixed to a facial side surface of the lens frame portion such that at least a portion of the interior cavity is separated from the lens frame portion by the exterior side surface of the bridge modular pod,
   the first arm having a modular pod,
   the second arm having a modular pod, whereas the interior cavity of the bridge modular pod, the first arm modular pod and second arm modular pod comprise respective volumes of air capable of displacing the lens frame portion atop a body of water to remain at a surface of the body of water.

2. The floating eyewear of claim 1, the bridge modular pod having curved portions, whereas the curved portions comprise a reverse model of a user's nasal root anatomy, the curved portions being manufactured according to information acquired from the user's nasal root anatomy.

3. The floating eyewear of claim 1, the bridge modular pod comprising a resilient element applied upon a portion of the bridge modular pod.

4. The floating eyewear of claim 1, the bridge modular pod being affixed to the lens portion by at least one hook.

5. The floating eyewear of claim 1 further comprising two lenses, the two lenses secured respectively within the lens frame portion, wherein the properties of the elements of the eyewear are in accordance with the following expressions:

$$L = V2 \times SG2, \text{ and}$$

$$F2 < B1 + B2 + B3 + (V2 \times SG2) + F1$$

where
V2 is a displacement of the two lenses
L is a buoyant force of the two lenses
F1 is a buoyant force of the lens frame portion
F2 is a buoyant force of the first and second arms and hinging portions
B1 is a buoyant force of the first arm modular pod
B2 is a buoyant force of the second arm modular pod
B3 is a buoyant force of the bridge modular pod
SG2 is a specific gravity of a material from which the two lenses are made.

6. The floating eyewear of claim 1, wherein the interior cavity has an interior wall that comprises curved aspects.

7. The floating eyewear of claim 1, the bridge modular pod being positioned adjacent to the facial side of the lens portion comprising a first and second member, the first and second member extending adjacent to a top portion of the facial side of the lens portion.

8. The floating eyewear of claim 7, the bridge modular pod further comprising:
a third member and a fourth member at the facial side of the lens frame portion, a center of the bridge modular pod, proximal to where the third member and the fourth member merge, a center of the lens frame portion.

9. The floating eyewear of claim 8, the third member and the fourth member including a curved portion that is raised over the center of the bridge modular pod.

10. The floating eyewear of claim 9, the bridge modular pod being affixed to the lens frame portion by at least one hook.

11. The floating eyewear of claim 1, wherein the interior cavity of the bridge modular pod comprises a first chamber and a second chamber extending along a generally parallel line to a top portion of the lens frame portion, a third chamber and a fourth chamber disposed below the first and second chambers or between the top portion of the lens frame portion and a bottom portion of the lens frame portion.

12. The floating eyewear of claim 11, the third chamber and the fourth camber of the interior cavity each having a greater altitude than that of the first chamber and second chamber of the interior cavity.

* * * * *